United States Patent
Kiyonaga et al.

(10) Patent No.: US 10,347,278 B1
(45) Date of Patent: Jul. 9, 2019

(54) DATA STORAGE DEVICE CONFIGURING A WRITE INHIBIT SHOCK THRESHOLD FOR MULTIPLE ACTUATORS

(71) Applicant: Western Digital Technologies, Inc., San Jose, CA (US)

(72) Inventors: Toshihisa Kiyonaga, San Jose, CA (US); Peng Huang, Lake Forest, CA (US); Junya Takeda, Fujisawa (JP); Edward C. Sibal, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/169,102

(22) Filed: Oct. 24, 2018

(51) Int. Cl.
*G11B 20/18* (2006.01)
*G11B 7/09* (2006.01)
*G11B 19/04* (2006.01)
*G11B 5/55* (2006.01)

(52) U.S. Cl.
CPC .......... *G11B 5/5582* (2013.01); *G11B 19/042* (2013.01)

(58) Field of Classification Search
CPC ....... G11B 27/36; G11B 20/18; G11B 5/5539; G11B 20/20; G11B 7/085; G11B 7/0956; G11B 7/0946; G11B 19/041; G11B 19/042

USPC .......................................... 360/31; 369/53.18
See application file for complete search history.

(56) References Cited

U.S. PATENT DOCUMENTS

| 5,299,075 | A | 3/1994 | Hanks |
| 6,429,990 | B2 * | 8/2002 | Serrano ................. G11B 19/04 360/60 |
| 6,882,489 | B1 | 4/2005 | Brunnett et al. |
| 6,914,743 | B1 | 7/2005 | Narayana et al. |
| 7,633,698 | B2 | 12/2009 | Finamore et al. |
| 8,179,626 | B1 | 5/2012 | Ryan et al. |
| 9,934,803 | B1 | 4/2018 | Semba et al. |

* cited by examiner

*Primary Examiner* — Nabil Z Hindi

(57) ABSTRACT

A data storage device is disclosed comprising a first actuator configured to actuate a first head over a first disk comprising a first plurality of tracks defined by first servo sectors, and a second actuator configured to actuate a second head over a second disk comprising a second plurality of tracks defined by second servo sectors. The first actuator is controlled based on the first servo sectors in order to first write data to the first disk, and the second actuator is controlled based on the second servo sectors in order to second write data to the second disk. The first writing is inhibited when a shock signal generated based on a shock sensor exceeds a first shock threshold, and the second writing is inhibited when the shock signal exceeds a second shock threshold different from the first shock threshold.

21 Claims, 7 Drawing Sheets

DATA STORAGE DEVICE CONFIGURING A WRITE INHIBIT SHOCK THRESHOLD FOR MULTIPLE ACTUATORS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
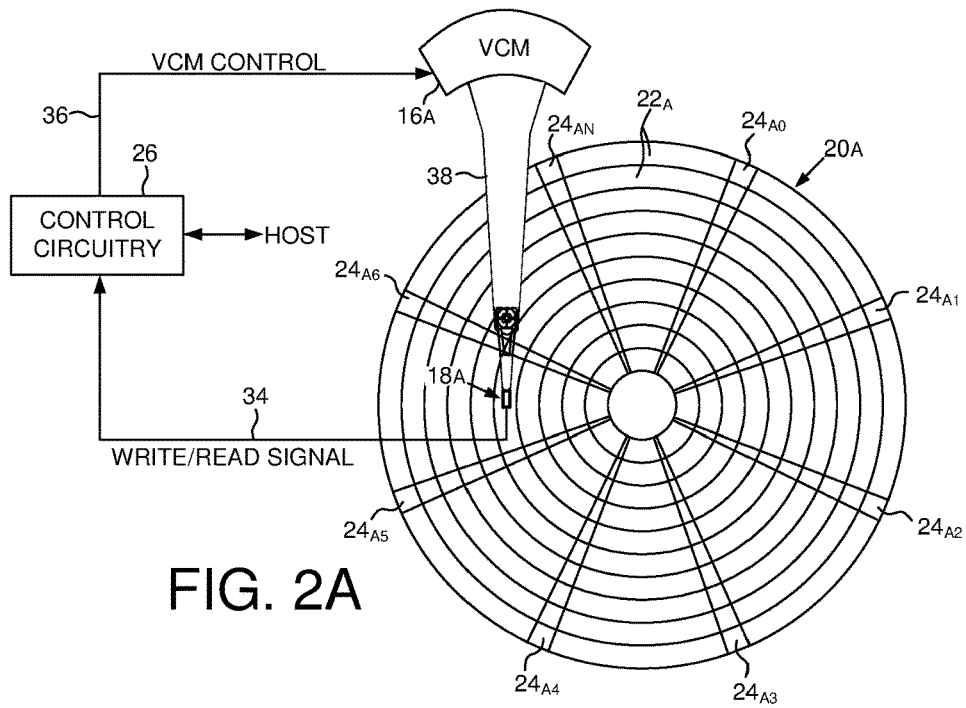
FIG. 2A shows a data storage device in the form of a disk drive according to an embodiment comprising a first actuator configured to actuate a first head over a first disk, and a second actuator configured to actuate a second head over a second disk.
Figure 2B:
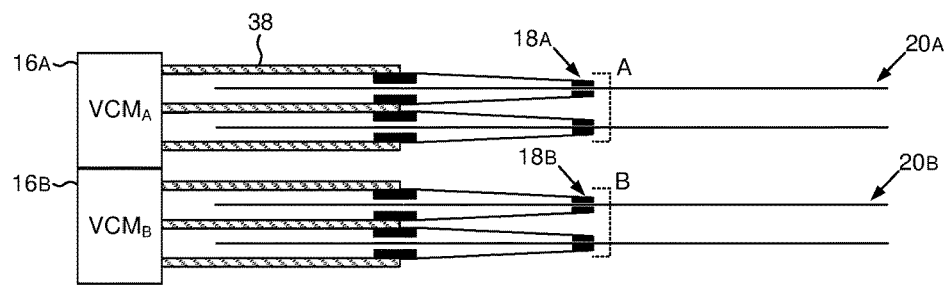
FIG. 2B shows an embodiment wherein the first actuator comprises a first VCM and the second actuator comprises a second VCM configured to rotate respective actuator arms about a common pivot.

FIGS. 2A and 2B show a data storage device in the form of a disk drive according to an embodiment comprising a first actuator $16_A$ configured to actuate a first head 18A over a first disk $20_A$ comprising a first plurality of tracks 22A defined by first servo sectors $24_{A0}$-$24_{AN}$, and a second actuator $16_B$ configured to actuate a second head 18B over a second disk 20B comprising a second plurality of tracks defined by second servo sectors. The disk drive further comprises control circuitry 26 comprising a shock sensor 28 (FIG. 2C), wherein the control circuitry 26 is configured to control the first actuator $16_A$ based on the first servo sectors in order to first write data to the first disk, and control the second actuator based on the second servo sectors in order to second write data to the second disk. The first writing to the disk is inhibited when a shock signal 30 generated based on the shock sensor 28 exceeds a first shock threshold $32_A$, and the second writing is inhibited when the shock signal 30 exceeds a second shock threshold $32_B$ different from the first shock threshold $32_A$.

Figure 1:
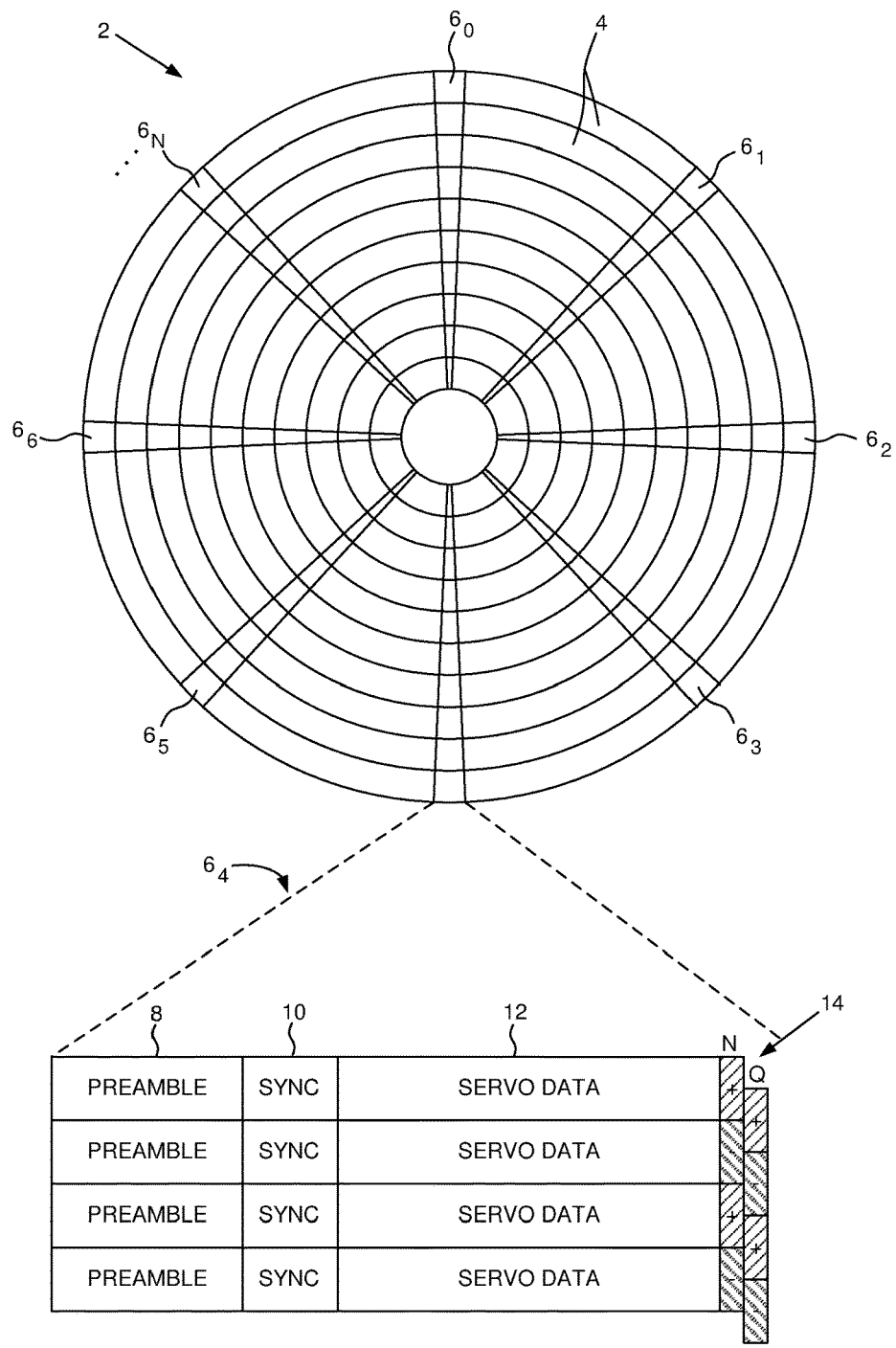
FIG. 1 shows a prior art disk format comprising a plurality of servo tracks defined by servo sectors.

In the embodiment of FIG. 2A, the control circuitry 26 processes a read signal 34 emanating from the head 18A to demodulate the servo sectors $24_{A0}$-$24_{AN}$ and generate a position error signal (PES) representing an error between the actual position of the head and a target position relative to a target track. A servo control system in the control circuitry 26 filters the PES using a suitable compensation filter to generate a control signal 36 applied to a VCM $16_A$ which rotates an actuator arm 38 about a pivot in order to actuate the head radially over the disk in a direction that reduces the PES. The servo sectors $24_{A0}$-$24_{AN}$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Any suitable actuators may be employed to actuate the heads over the respective disks. In the embodiment of FIG. 2B, the first actuator $16_A$ comprises a first $VCM_A$ and the second actuator $16_B$ comprises a second $VCM_B$ which rotate respective actuator arms about a common pivot. In the example of FIG. 2B, each VCM rotates three actuator arms about the common pivot so as to actuator eight heads over respective disk surfaces (four for each actuator). However, other embodiments may employ any suitable number of VCMs which may rotate any suitable number of actuator arms about the common pivot. In another embodiment, the first and second actuators may comprise independent VCMs that each rotate respective actuator arms about respective pivots. In yet other embodiments, the first and second actuators may comprise a secondary actuator, such as a secondary actuator configured to actuate a suspension that couples the head to the actuator arm, or a secondary actuator configured to actuate the head relative to the suspension.

Figure 2C:
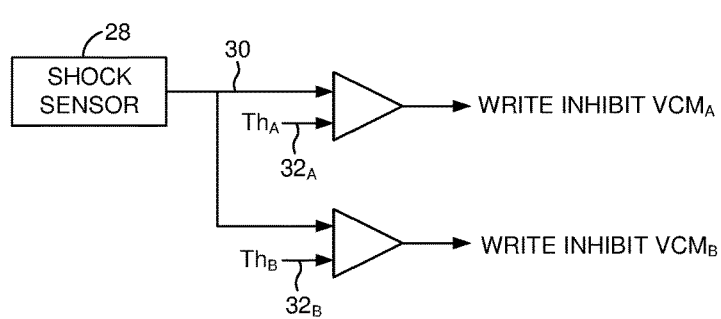
FIG. 2C shows an embodiment wherein control circuitry of the disk drive comprises a shock sensor configured to generate a shock signal that is compared to different shock thresholds corresponding to each actuator.

In the embodiment of FIG. 2C, any suitable shock sensor 28 may be employed, such as a suitable accelerometer or other device capable of transducing a disturbance affecting the disk drive into a shock signal 30. In one embodiment, a single shock sensor 28 is employed, such as a shock sensor mounted on a printed circuit board together with other control circuitry 26. The shock signal 30 is processed by the control circuitry in order to inhibit a write operation before the resulting off-track displacement of the head corrupts data recorded in the adjacent data tracks. In the embodiment of FIG. 2C, a write inhibit signal is activated when the shock signal 30 exceeds a shock threshold. Any suitable circuitry may be employed to compare the shock signal 30 to the shock threshold, such as with an analog comparator, or by sampling the shock signal 30 and comparing the digital values to the shock threshold with a digital comparator. In another embodiment, the different shock thresholds of a comparator may be configured by adjusting the gain of independent amplifiers configured to amplify the shock signal 30 before being compared to a common threshold. In one embodiment, the sensitivity of the shock detection circuitry is calibrated (e.g., by calibrating the shock threshold) to achieve a suitable tradeoff between inhibiting a write operation to avoid corrupting the adjacent data tracks and the performance degradation of having to re-execute at least part of the write operations.

In the embodiment of FIG. 2C, the shock detection circuitry comprises a different shock threshold for each actuator, such as a first shock threshold $32_A$ associated with the first actuator $16_A$ and a second shock threshold $32_B$ associated with the second actuator $16_B$. A different shock threshold may be employed for each actuator to achieve any suitable benefit, such as to compensate for a different frequency response of each actuator due, for example, to manufacturing tolerances of the actuators. For example, when an actuator's frequency response results in better disturbance rejection by the servo system, the corresponding shock threshold for the actuator may be adjusted higher so as to decrease the sensitivity of the shock detection circuitry. In other words, a better performing actuator may compensate for a particular amplitude shock event so that inhibiting a write operation may be unnecessary, whereas a degraded actuator may be unable to compensate for the shock event so that inhibiting the write operation is necessary to avoid corrupting the adjacent data tracks.

In one embodiment, when one of the actuators is performing a seek operation to seek a corresponding head over a disk it may induce a coupling disturbance into the servo system of another of the actuators that may be performing a tracking operation while writing data to an another of the disks. The coupling disturbance may be compensated by the servo system using suitable feed-forward compensation, an example of which is described in U.S. Pat. No. 9,934,803 entitled "DATA STORAGE DEVICE ATTENUATING MULTIPLE ACTUATOR COUPLING DISTURBANCE," the disclosure of which is incorporated herein by reference.

Figure 3A:
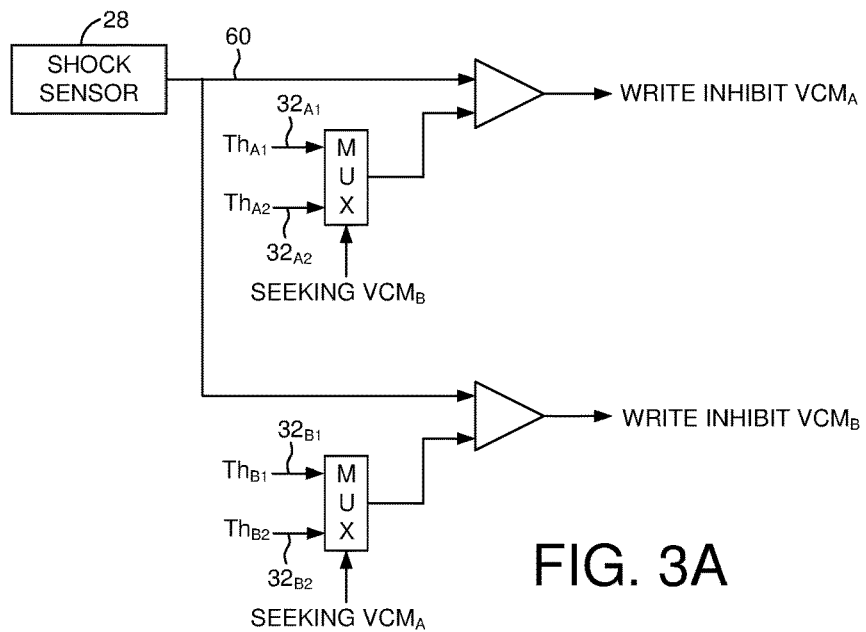
FIG. 3A shows an embodiment wherein the shock threshold of a first actuator is configured based on whether a second actuator is seeking.

Accordingly in one embodiment, when a first actuator is seeking and a second actuator is tracking to perform a write operation, the shock threshold for the second actuator may be increased in order to decrease the sensitivity of the shock detection circuitry. That is, the effect of the seek disturbance on the shock detection circuitry may be de-emphasized since the servo control system may compensate at least in part for the disturbance. An example of this embodiment is shown in FIG. 3A, wherein for the first actuator $16_A$ the shock signal 30 may be compared to a first shock threshold $32_{A1}$ while the second actuator $16_B$ is not seeking, and compared to a second shock threshold $32_{A2}$ while the second actuator $16_B$ is seeking. In the example of FIG. 3A, a multiplexer is shown as configuring the shock thresholds based on the seek status of each actuator, but the shock thresholds may be configured in any suitable manner.

Figure 3B:
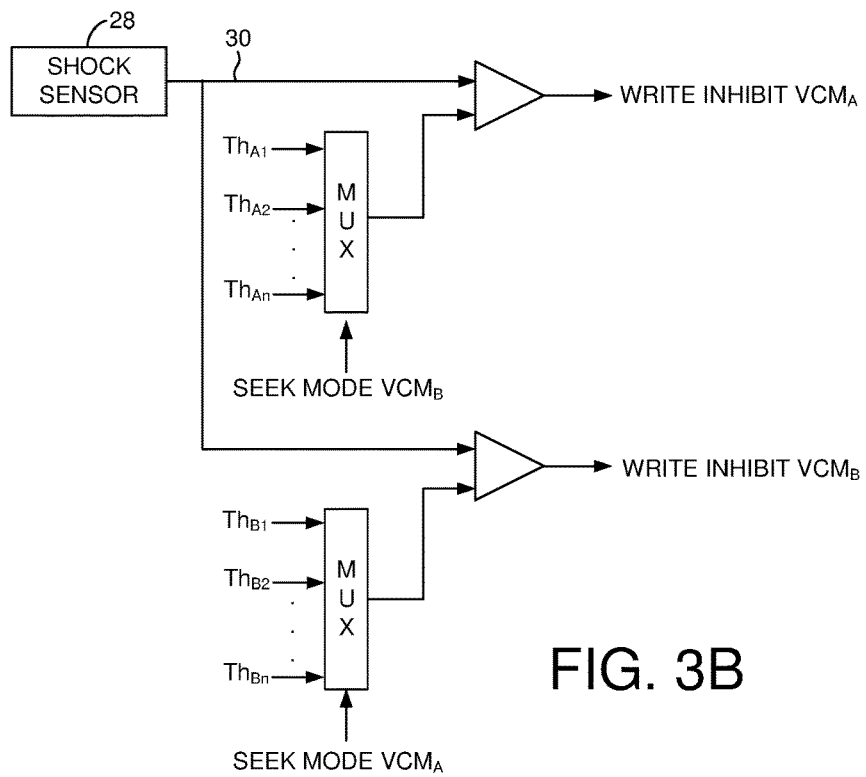
FIG. 3B shows an embodiment wherein the shock threshold of a first actuator is configured based on the seek mode of a second actuator, such as accelerating, constant velocity, or decelerating mode.

FIG. 3B shows an embodiment wherein the shock threshold for a first actuator may be configured based on a seek mode of a second actuator. In one embodiment, there may be four seek modes, including tracking (not seeking), accelerating, constant velocity, and decelerating. During each of the seek modes of a second actuator, there may be a different coupling disturbance affecting a first actuator that is tracking a write operation, as well as a different efficacy of the servo system to compensate for each coupling disturbance. Accordingly in one embodiment, the shock threshold for each actuator may be adjusted in order to increase or decrease the sensitivity of the shock detection circuitry depending on the seek mode and corresponding coupling disturbance induced by the other actuator(s).

Figure 4:
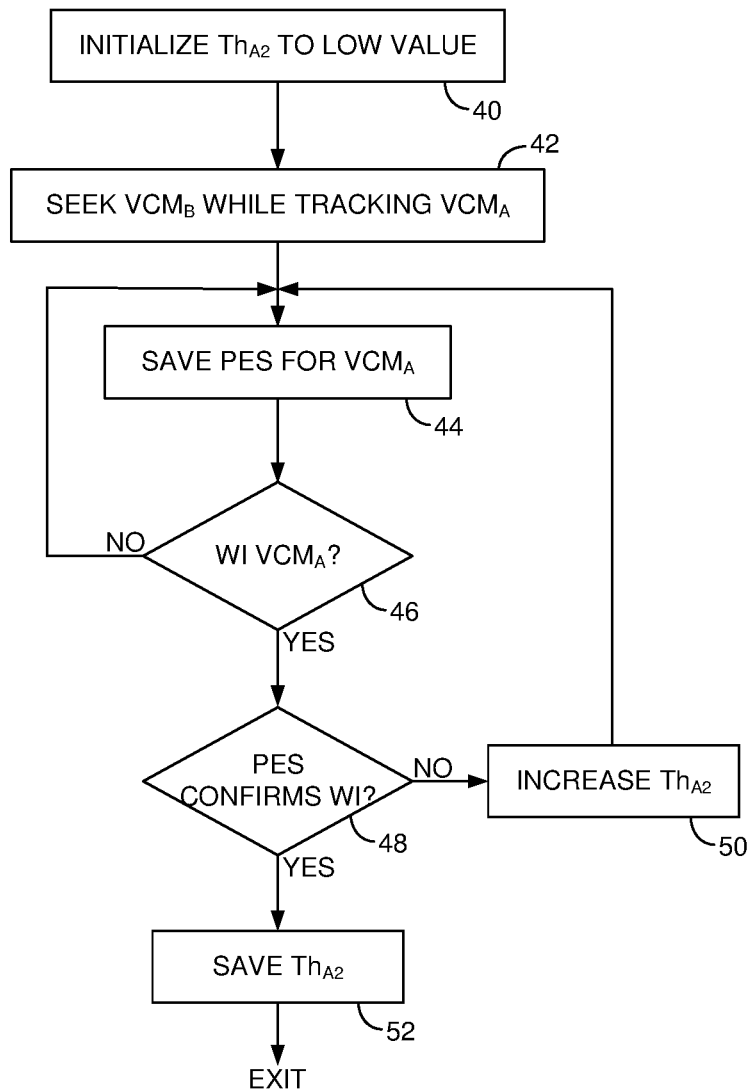
FIG. 4 is a flow diagram according to an embodiment wherein the shock threshold for a first actuator may be calibrated by seeking a second actuator and adjusting the shock threshold until a shock event is confirmed by the PES generated for the first actuator.

FIG. 4 is a flow diagram according to an embodiment that may be employed to calibrate the shock threshold $Th_{A2}$ for a first actuator that corresponds to a seek disturbance caused by seeking a second actuator. The shock threshold $Th_{A2}$ is initialized to a low value that ensures a shock event will be detected during the seek operation (block 40). A seek operation is initiated for the second actuator while performing a tracking operation of the first actuator (block 42), and during the seek operation the PES generated at each servo sector for the first actuator is saved (block 44). When the shock detection circuitry detects a shock event and asserts a write inhibit (block 46), the PES for the first actuator is evaluated to verify whether the detected shock event should have triggered the write inhibit. For example, in one embodiment the shock event is confirmed when the PES exceeds a predetermined threshold indicating the head is approaching an off-track condition. When the PES confirms the detected shock event, the corresponding shock threshold $Th_{A2}$ is saved (block 52) and used as the operating threshold during write operations. When the PES does not confirm the detected shock event (block 48), the shock threshold $Th_{A2}$ is increased in order to decrease the sensitivity of the shock detection circuitry (block 50), and the flow diagram of FIG. 4 is repeated from block 44 until the PES confirms the detected shock event. In one embodiment, the flow diagram of FIG. 4 may be executed for different seek lengths and a corresponding shock threshold $Th_{A2}$ calibrated for each seek length. In another embodiment, the flow diagram of FIG. 4 may be executed to calibrate the shock threshold $Th_{A2}$ for each seek mode of the seek (acceleration, constant velocity, deceleration) as described above with reference to FIG. 3B. The flow diagram of FIG. 4 may be executed during a manufacturing procedure or while the disk drive is deployed in the field. When in the field, the flow diagram may be executed when the first actuator is tracking during an idle mode or tracking a read operation since asserting the write inhibit does not affect a read operation.

Figure 5A:
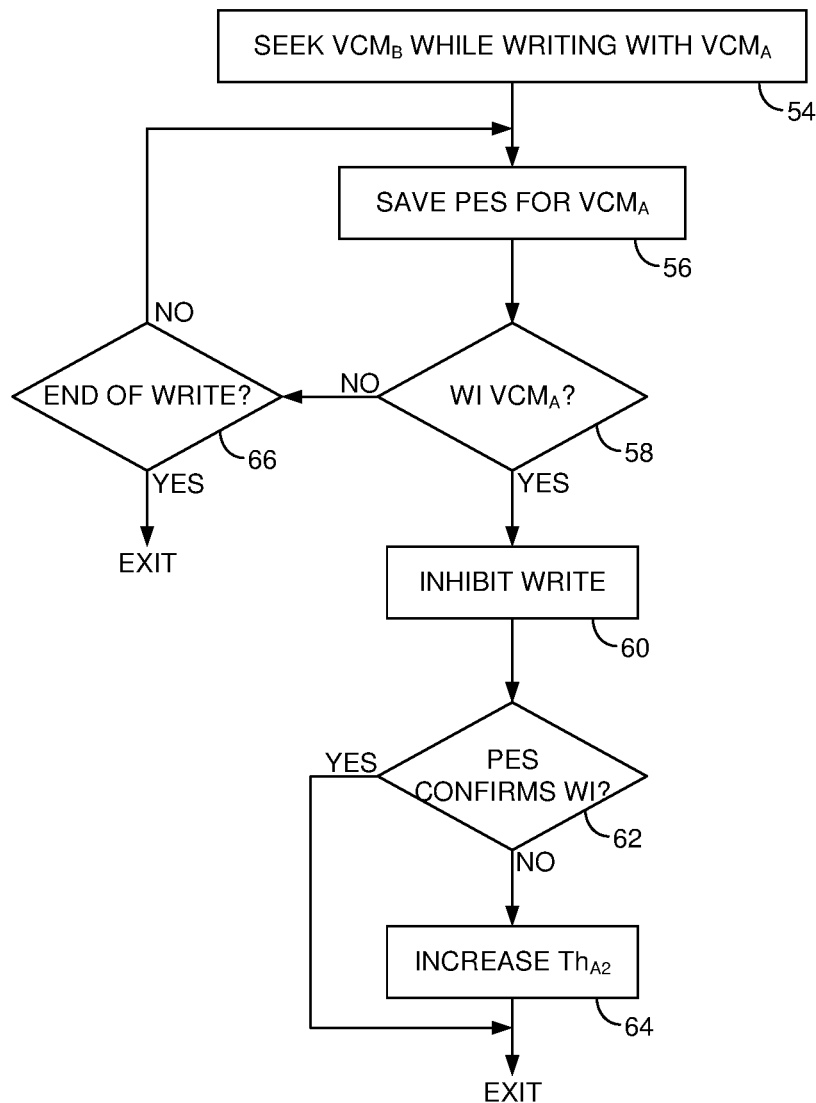
FIG. 5A is a flow diagram according to an embodiment wherein when a shock event is detected by the shock detection circuitry while writing data to the disk, the corresponding shock threshold is increased if the PES does not confirm the shock event in order to decrease the sensitivity of the shock detection circuitry for the corresponding actuator.

FIG. 5A is a flow diagram according to an embodiment wherein the shock threshold $Th_{A2}$ for a first actuator may be updated while tracking a write operation and while seeking a second actuator (block 54). While tracking the first actuator during the write operation the PES for the first actuator is saved (block 56). If the shock detection circuitry asserts the write inhibit (block 58), the writing to the disk is inhibited (block 60) and the PES for the first actuator is evaluated to verify whether the detected shock event should have triggered the write inhibit (block 62). If the PES does not confirm the shock event, the shock threshold $Th_{A2}$ for the first actuator is increased in order to decrease the sensitivity of the shock detection circuitry (block 64). The updated shock threshold $Th_{A2}$ is then used during subsequent write operations using the first actuator while the second actuator is seeking. If a shock event is not detected during the write operation (block 66), the shock threshold $Th_{A2}$ is not adjusted.

Figure 5B:
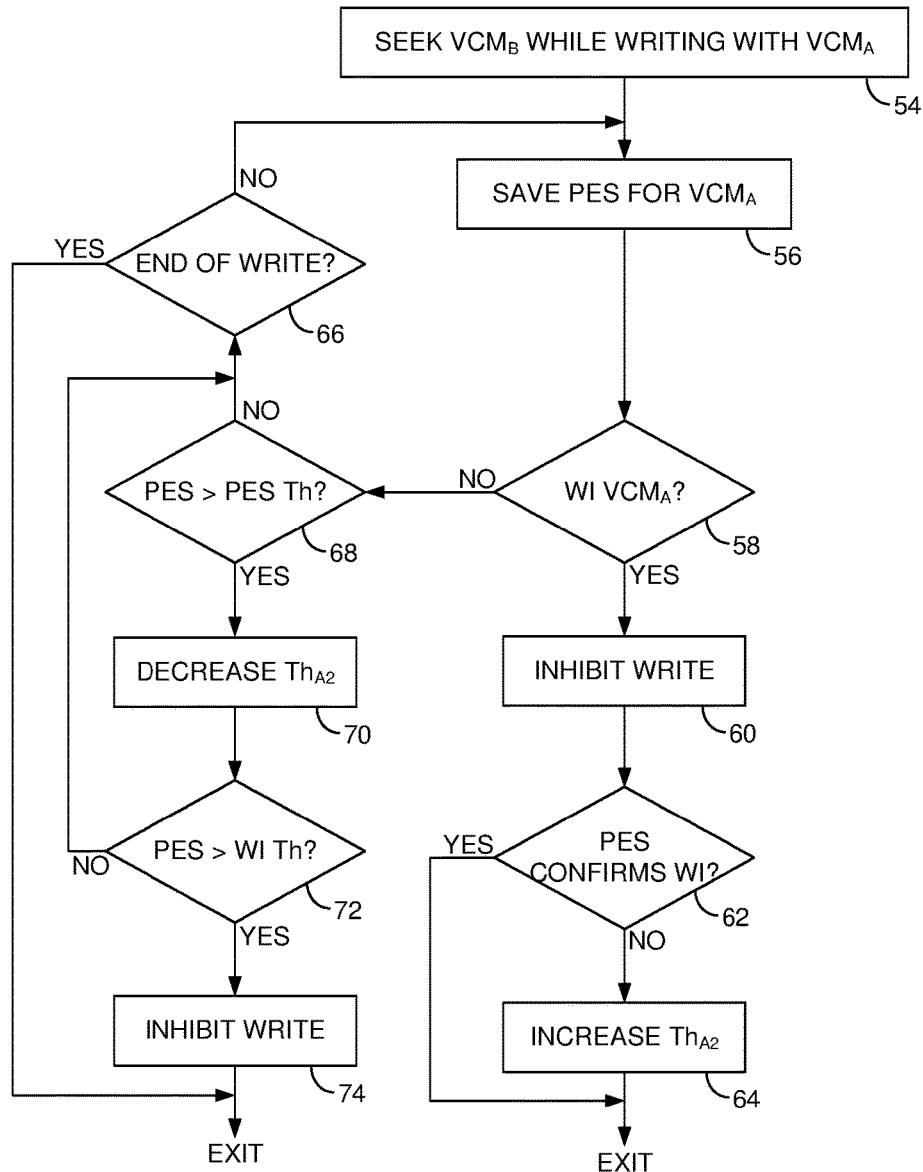
FIG. 5B is a flow diagram according to an embodiment wherein when a shock event is detected based on the PES exceeding a threshold, the corresponding shock threshold is decreased in order to increase the sensitivity of the shock detection circuitry for the corresponding actuator.

FIG. 5B is a flow diagram according to an embodiment which extends on the flow diagram of FIG. 5A, wherein when a shock event is not detected (block 58) by the shock detection circuitry, the PES for the first actuator is evaluated during the write operation to determine whether the shock detection threshold $Th_{A2}$ should be updated. If the PES exceeds a predetermined PES threshold (e.g., a learned or calibrated threshold) indicating the head is approaching an off-track condition (block 68), the threshold $Th_{A2}$ for the first actuator is decreased in order to increase the sensitivity of the shock detection circuitry (block 70). If the PES exceeds a write inhibit (WI) threshold higher than the PES threshold (block 72) indicating the head has reached the off-track condition, the writing is inhibited (block 74). In one embodiment, the shock detection threshold $Th_{A2}$ may be updated or recalibrated over time in order to compensate for variations in the operating conditions of the disk drive, such as environmental variations (e.g., vibrations, temperature, etc.) or degradation of one or more components (e.g., actuator, head, etc.).

Figure 6A:
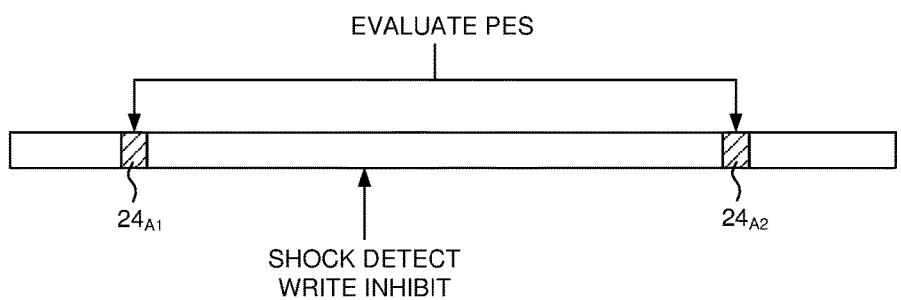
FIG. 6A shows an embodiment wherein when a write inhibit shock event is detected by the shock detection circuitry, the shock event may be confirmed by evaluating the PES preceding and following the detected shock event.

FIG. 6A shows an embodiment wherein when a shock event is detected by the shock detection circuitry during a write operation while the head is between consecutive servo sectors, the PES generated at both the preceding servo sector (e.g., servo sector $24_{A1}$) and the following servo sector (e.g., servo sector $24_{A2}$) are evaluated in order to confirm the shock event (e.g., at block 62 of FIG. 5B). That is, even though the write operation may be inhibited while the head is between servo sectors, the PES generated while reading one or more of the preceding and following servo sectors may be evaluated in order to confirm the write inhibit was warranted. In one embodiment, the PES generated at each servo sector may be compared to a threshold to detect an off-track condition, and in another embodiment, any suitable signal processing may be performed on the PES generated at each servo sector, such as any suitable filtering, curve fitting, etc., in order to confirm the detected shock event.

Figure 6B:
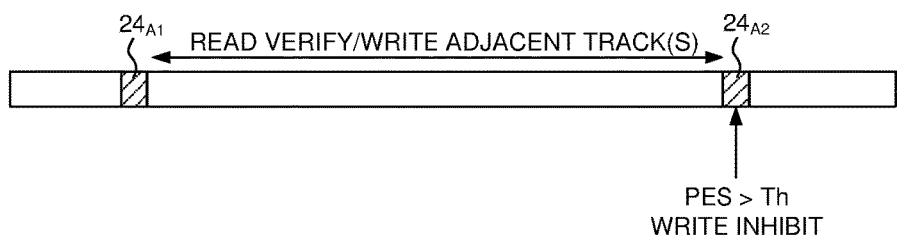
FIG. 6B shows an embodiment wherein when a write inhibit shock event is detected by the PES exceeding a threshold, a read-verify-write of one or more adjacent tracks may be executed to recover from an off-track write.

FIG. 6B shows an embodiment wherein when the PES generated at a servo sector exceeds a threshold during a write operation indicating that the shock detection circuitry may have missed a shock event, the shock threshold for the corresponding actuator is decreased in order to increase the sensitivity of the shock detection circuitry as described above with reference to FIG. 5B. In one embodiment when a shock event is detected based on the PES, it may be assumed that one more of the adjacent tracks was likely corrupted due to an off-track write. Accordingly in one embodiment one or more of the adjacent tracks are read verified and optionally rewritten (e.g., if the read verify indicates degradation). In one embodiment, any suitable error recovery techniques may be employed to recover an unreadable part of a track, such as by processing one or more parity sectors recorded in the track.

In the embodiment shown in FIG. 2C, the shock signal 30 generated by the shock sensor 28 is compared to respective thresholds corresponding to each actuator. In another embodiment, the shock signal 30 may be generated by filtering the output of the shock sensor 28, for example, to extract a frequency component that better correlates with a disturbance affecting the tracking of an actuator during a write operation. The output of the shock sensor 28 may be filtered or otherwise conditioned using any suitable techniques, including any suitable analog circuitry operating on the analog signal, or digital circuitry operating on the sampled output of the shock sensor 28.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a first actuator configured to actuate a first head over a first disk comprising a first plurality of tracks defined by first servo sectors;
   a second actuator configured to actuate a second head over a second disk comprising a second plurality of tracks defined by second servo sectors; and
   control circuitry comprising a shock sensor, the control circuity configured to:
      control the first actuator based on the first servo sectors in order to first write data to the first disk;
      control the second actuator based on the second servo sectors in order to second write data to the second disk;
      inhibit the first writing when a shock signal generated based on the shock sensor exceeds a first shock threshold; and
      inhibit the second writing when the shock signal exceeds a second shock threshold different from the first shock threshold.

2. The data storage device as recited in claim 1, wherein the control circuitry is further configured to:
   adjust the first shock threshold to compensate for the second actuator seeking the second head over the second disk; and
   adjust the second shock threshold to compensate for the first actuator seeking the first head over the first disk.

3. The data storage device as recited in claim 2, wherein the control circuitry is further configured to:
   increase the first shock threshold to compensate for the second actuator seeking the second head over the second disk; and
   increase the second shock threshold to compensate for the first actuator seeking the first head over the first disk.

4. The data storage device as recited in claim 2, wherein the control circuitry is further configured to:
   adjust the first shock threshold to compensate for the second actuator accelerating the second head over the second disk; and
   adjust the second shock threshold to compensate for the first actuator accelerating the first head over the first disk.

5. The data storage device as recited in claim 2, wherein the control circuitry is further configured to:
   adjust the first shock threshold to compensate for the second actuator decelerating the second head over the second disk; and
   adjust the second shock threshold to compensate for the first actuator decelerating the first head over the first disk.

6. The data storage device as recited in claim 2, wherein the control circuitry is further configured to calibrate the adjustment to the first shock threshold by:
   controlling the second actuator to seek the second head over the second disk and concurrently controlling the first actuator to track the first head over the first disk;
   generating a first position error signal (PES) based on the first head reading the first servo sectors on the first disk surface during the tracking of the first disk surface; and
   adjusting the first shock threshold based on the first PES.

7. The data storage device as recited in claim 6, wherein the control circuitry is further configured to calibrate the adjustment to the first shock threshold by increasing the first shock threshold when the first PES does not exceed a PES threshold.

8. The data storage device as recited in claim 6, wherein the control circuitry is further configured to calibrate the adjustment to the first shock threshold by decreasing the first shock threshold when the first PES exceeds a PES threshold and the shock signal does not exceed the first shock threshold.

9. The data storage device as recited in claim 8, wherein the control circuitry is further configured to calibrate the adjustment to the first shock threshold by inhibiting writing to the first disk surface when the first PES exceeds a write inhibit threshold.

10. The data storage device as recited in claim 2, wherein the control circuitry is further configured to:
    control the second actuator to seek the second head over the second disk during the first writing to the first disk;
    generate a first position error signal (PES) based on the first head reading the first servo sectors on the first disk surface during the seek;
    inhibit the first writing when the shock signal exceeds the first shock threshold; and
    increase the first shock threshold when the first PES does not exceed a PES threshold.

11. A method of operating a data storage device, the method comprising:
    first writing data to a first disk while controlling a first actuator based on first servo sectors recorded on the first disk;
    second writing data to a second disk while controlling a second actuator based on second servo sectors recorded on the second disk;
    inhibiting the first writing when a shock signal exceeds a first shock threshold; and
    inhibiting the second writing when the shock signal exceeds a second shock threshold different from the first shock threshold.

12. The method as recited in claim 11, further comprising:
    adjusting the first shock threshold to compensate for the second actuator seeking a second head over the second disk; and
    adjusting the second shock threshold to compensate for the first actuator seeking a first head over the first disk.

13. The method as recited in claim 12, further comprising:
    increasing the first shock threshold to compensate for the second actuator seeking the second head over the second disk; and
    increasing the second shock threshold to compensate for the first actuator seeking the first head over the first disk.

14. The method as recited in claim 12, further comprising:
adjusting the first shock threshold to compensate for the second actuator accelerating the second head over the second disk; and
adjusting the second shock threshold to compensate for the first actuator accelerating the first head over the first disk.

15. The method as recited in claim 12, further comprising:
adjusting the first shock threshold to compensate for the second actuator decelerating the second head over the second disk; and
adjusting the second shock threshold to compensate for the first actuator decelerating the first head over the first disk.

16. The method as recited in claim 12, further comprising calibrating the adjustment to the first shock threshold by:
controlling the second actuator to seek the second head over the second disk and concurrently controlling the first actuator to track the first head over the first disk;
generating a first position error signal (PES) based on the first head reading the first servo sectors on the first disk surface during the tracking of the first disk surface; and
adjusting the first shock threshold based on the first PES.

17. The method as recited in claim 16, further comprising calibrating the adjustment to the first shock threshold by increasing the first shock threshold when the first PES does not exceed a PES threshold.

18. The method as recited in claim 16, further comprising calibrating the adjustment to the first shock threshold by decreasing the first shock threshold when the first PES exceeds a PES threshold and the shock signal does not exceed the first shock threshold.

19. The method as recited in claim 18, further comprising calibrating the adjustment to the first shock threshold by inhibiting writing to the first disk surface when the first PES exceeds a write inhibit threshold.

20. The method as recited in claim 12, further comprising:
controlling the second actuator to seek the second head over the second disk during the first writing to the first disk;
generating a first position error signal (PES) based on the first head reading the first servo sectors on the first disk surface during the seek;
inhibiting the first writing when the shock signal exceeds the first shock threshold; and
increasing the first shock threshold when the first PES does not exceed a PES threshold.

21. Control circuitry comprising a shock sensor configured to generate a shock signal indicating a disturbance to a data storage device, the control circuitry configured to:
generate a write inhibit signal when the shock signal exceeds a first shock threshold corresponding to a first actuator of the data storage device; and
generate the write inhibit signal when the shock signal exceeds a second shock threshold corresponding to a second actuator of the data storage device, wherein the second shock threshold is different from the first shock threshold.

* * * * *